US011553336B2

(12) United States Patent
Bamidi et al.

(10) Patent No.: US 11,553,336 B2
(45) Date of Patent: Jan. 10, 2023

(54) SYSTEM AND METHOD FOR PROCESSING OF PRIVATE BEACONS IN A MESH NETWORK

(71) Applicant: Silvair Sp. z o.o., Cracow (PL)

(72) Inventors: Ravi Kiran Bamidi, Bangalore (IN); Piotr Winiarczyk, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 727 days.

(21) Appl. No.: 16/551,205

(22) Filed: Aug. 26, 2019

(65) Prior Publication Data

US 2020/0374692 A1 Nov. 26, 2020

(30) Foreign Application Priority Data

May 23, 2019 (IN) .............................. 201921020537

(51) Int. Cl.
| | |
|---|---|
| *H04W 12/03* | (2021.01) |
| *H04W 12/037* | (2021.01) |
| *H04W 40/24* | (2009.01) |
| *H04W 4/80* | (2018.01) |
| *H04W 12/06* | (2021.01) |
| *H04W 12/041* | (2021.01) |
| *H04W 84/18* | (2009.01) |

(52) U.S. Cl.
CPC .......... *H04W 12/037* (2021.01); *H04W 4/80* (2018.02); *H04W 12/041* (2021.01); *H04W 12/06* (2013.01); *H04W 40/244* (2013.01); *H04W 84/18* (2013.01)

(58) Field of Classification Search
CPC ... H04W 12/037; H04W 4/80; H04W 12/041; H04W 12/06; H04W 40/244; H04W 84/18; H04W 12/04; H04L 9/0894; H04L 9/14; H04L 9/3242
See application file for complete search history.

(56) References Cited

U.S. PATENT DOCUMENTS

| | | | |
|---|---|---|---|
| 2009/0122770 A1* | 5/2009 | Korakis ................. | H04W 12/03 370/310 |
| 2019/0014528 A1* | 1/2019 | Skillermark ........ | H04W 40/246 |
| 2019/0068559 A1* | 2/2019 | Bamidi ................. | H04W 12/02 |
| 2019/0116046 A1* | 4/2019 | Hoyer ................... | H04L 9/0643 |
| 2020/0146088 A1* | 5/2020 | Kharvar .............. | H04L 63/0428 |

* cited by examiner

*Primary Examiner* — Harunur Rashid
(74) *Attorney, Agent, or Firm* — McGeary Cukor LLC; Kenneth Ottesen; Jason Paul DeMont

(57) ABSTRACT

A mesh device for receiving and processing a private beacon message, which can be represented by one or more Bluetooth Low Energy mesh packets. Upon receiving the private beacon message, the mesh device decrypts a first portion of the private beacon by using a first encryption key corresponding to a first subnet, wherein the first portion comprises an initialization vector (IV), in the form of an index or other indicator. The decrypting using the first encryption key results in a first decrypted value for the IV index. The mesh device then determines whether the first decrypted value for the IV index is valid or invalid. If the mesh device determines the first decrypted value to be valid, the mesh device proceeds with authenticating the data contained in the private beacon message.

19 Claims, 6 Drawing Sheets

SYSTEM AND METHOD FOR PROCESSING OF PRIVATE BEACONS IN A MESH NETWORK

CROSS REFERENCE TO RELATED APPLICATION

This application is related to "System and Method for Processing of Private Beacons in a Mesh Network," Indian Application Serial Number IN 201921020537 and filed on May 23, 2019, incorporated by reference herein.

FIELD OF THE INVENTION

The present invention relates to wireless telecommunications in general and, more particularly, to a technique for message processing of private beacons in a mesh network.

BACKGROUND OF THE INVENTION

Wireless communication devices, and their usage, have become more common over time. There are various reasons for this. Advances in electronic technology have reduced the cost of the increasingly complex devices. Advances in electronic technology have also resulted in smaller and more powerful wireless communication devices, and consequently more useful devices. For example, there currently exists a variety of wireless communication devices such as portable wireless terminals (e.g., smartphones), personal digital assistants (PDAs), laptop computers, tablet computers, and other electronic devices that are small, lightweight, and can be easily carried by users. The reductions in cost and size, and concomitant increase in consumer demand, have proliferated the use of wireless communication devices, making them ubiquitous in everyday life.

As the usage of wireless communication devices has expanded, so has the demand for new and improved features in said devices. More specifically, users demand wireless communication devices that perform new functions and that perform functions faster, more efficiently, and more reliably.

A wireless communication device utilizes one or more wireless communication technologies in order to telecommunicate with other devices and systems. For example, a wireless communication device might communicate using Bluetooth technology or another wireless technology or technologies, such as a cellular or WiFi technology, and in various combinations of one or more technologies. In some cases, a wireless communication device might be a node in a mesh network, which provides a way to route data more efficiently than in other types of networks.

A mesh network can be provisioned with beacons, which are hardware transmitters that broadcast their identifier to nearby portable electronic devices. The term "beacon" can also refer to the message in which the identifier is broadcast. Beacon technology enables wireless communication devices to perform actions when in close proximity to a beacon. For example, the beacons within an overall mesh network, such as that of a building, can be assigned to different subnets, which in turn can be assigned to respective rooms or other areas within the building.

Private beacons in a mesh network improve the privacy of the user, in part by using a network key, such as an encryption key or a privacy key. The network keys can be provisioned on a subnet-by-subnet basis within the mesh network. In a private beacon message that is broadcast, at least some of the data is encrypted and appears random to an eavesdropper who lacks knowledge of the network key.

SUMMARY OF THE INVENTION

In at least some types of wireless mesh networks, data conveyed by a private beacon is encrypted and authenticated using AES-CCM, which stands for "Advanced Encryption Standard-Counter with Cipher Block Chaining-Message Authentication Code", with a 128-bit key that is derived from a network key. A node within a mesh network can belong to more than one subnet and is provisioned in advance with one network key for each subnet to which it belongs. When a private beacon is received, the mesh node has to try authenticating the private beacon with the available subnet network keys, in order to identify the network and extract the payload data.

For each available subnet being processed by the receiving mesh node, the conventional method of decryption and authentication can involve four (4) AES-128-bit operations. This means that for a mesh node belonging to N subnets, as a worst case there are 4*N 128-bit AES (or "AES-128 encryption") operations that are required to decrypt and authenticate the data correctly. This also means that in the case of a private beacon being transmitted from a subnet that is unknown to the receiving mesh node, 4*N AES-128 operations are required by the mesh node before discarding the private beacon for the unknown subnet. Accordingly, this conventional method can be computationally expensive at the receiving mesh node, resulting possibly in greater power consumption and longer response time by the receiving mesh node.

The present invention enables faster processing of private beacons. As disclosed herein, a mesh device of the illustrative embodiment receives a private beacon message, which can be represented by one or more Bluetooth Low Energy (LE) mesh packets. Upon receiving the private beacon message, the mesh device decrypts a first portion of the private beacon by using a first encryption key corresponding to a first subnet, wherein the first portion comprises an initialization vector (IV), in the form of an index or other indicator. The decrypting using the first encryption key results in a first decrypted value for the IV index. The mesh device then determines whether the first decrypted value for the IV index is valid or invalid. If the mesh device determines the first decrypted value to be valid, the mesh device proceeds with authenticating the data contained in the private beacon message.

Authenticating the data can comprise generating a generated message integrity check (MIC) value, and also comparing the generated MIC value and a MIC value that is received in a second portion of the private beacon.

In some embodiments of the present invention, determining whether the first decrypted value is valid comprises checking whether the first decrypted value is within a predetermined range that is defined by the current IV state of the mesh device. The range can be further defined by an offset in relation to the current IV state.

If the mesh device determines the first decrypted value to be invalid (not valid), the mesh device can retrieve a second encryption key corresponding to a second subnet. The mesh device decrypts the first portion of the private beacon by using the second encryption key, wherein the decrypting using the second encryption key results in a second decrypted value for the IV index. The mesh device then determines whether the second decrypted value for the IV index is valid or invalid. If the mesh device determines the second decrypted value to be valid, the mesh device proceeds with authenticating the data in the private beacon message. The mesh device can process the private beacon based on additional subnets as needed.

The disclosed method of decryption and authentication is advantageous, in that in most cases it reduces the number of AES operations to one (1) operation instead of four (4) operations when a mesh device attempts to decode a private beacon using the wrong key. There is only one AES operation in most, but not all, cases because the probability of generating invalid data when decoded with a wrong key is high, but not 100 percent. This is because out of 32 bits in the IV Index field, only six (6) bits of incremental information is present. Consequently, the probability of undesirably generating a valid IV Index value with a wrong key is extremely unlikely—at less than 1 chance in $2^{(32-6)}$, or $2^{26}$. Even in the unlikely case that the mesh device does, in fact, generate a valid IV Index value with a wrong key, the subsequent authenticating of the data acts as a safeguard, in that the authentication will fail.

An illustrative method comprises: receiving, by first mesh device, one or more packets transmitted by a second mesh device; retrieving, by the first mesh device, a first encryption key corresponding to a first subnet; decrypting, by the first mesh device, a first portion of the one or more packets by using the first encryption key, wherein the first portion comprises an initialization vector (IV), and wherein the decrypting using the first encryption key results in a first decrypted value for the initialization vector; determining, by the first mesh device, whether the first decrypted value for the initialization vector is valid or invalid; and authenticating, by the first mesh device, data in the one or more packets after determining that the first decrypted value for the initialization vector is valid.

An illustrative mesh device comprises: a receiver configured to receive one or more packets transmitted by another mesh device; and a processor configured to: (i) retrieve a first encryption key corresponding to a first subnet, (ii) decrypt a first portion of the one or more packets by using the first encryption key, wherein the first portion comprises an initialization vector (IV), and wherein decryption using the first encryption key results in a first decrypted value for the initialization vector, (iii) determine whether the first decrypted value for the initialization vector is valid or invalid, and (iv) authenticate data in the one or more packets after determining that the first decrypted value for the initialization vector is valid.

An illustrative non-transitory tangible computer readable medium storing computer executable code, comprises code for causing a first mesh device to: receive one or more packets transmitted by a second mesh device; retrieve a first encryption key corresponding to a first subnet; decrypt a first portion of the one or more packets by using the first encryption key, wherein the first portion comprises an initialization vector (IV), and wherein decryption using the first encryption key results in a first decrypted value for the initialization vector; determine whether the first decrypted value for the initialization vector is valid or invalid; and authenticate data in the one or more packets after determining that the first decrypted value for the initialization vector is valid.

DETAILED DESCRIPTION

Figure 1:
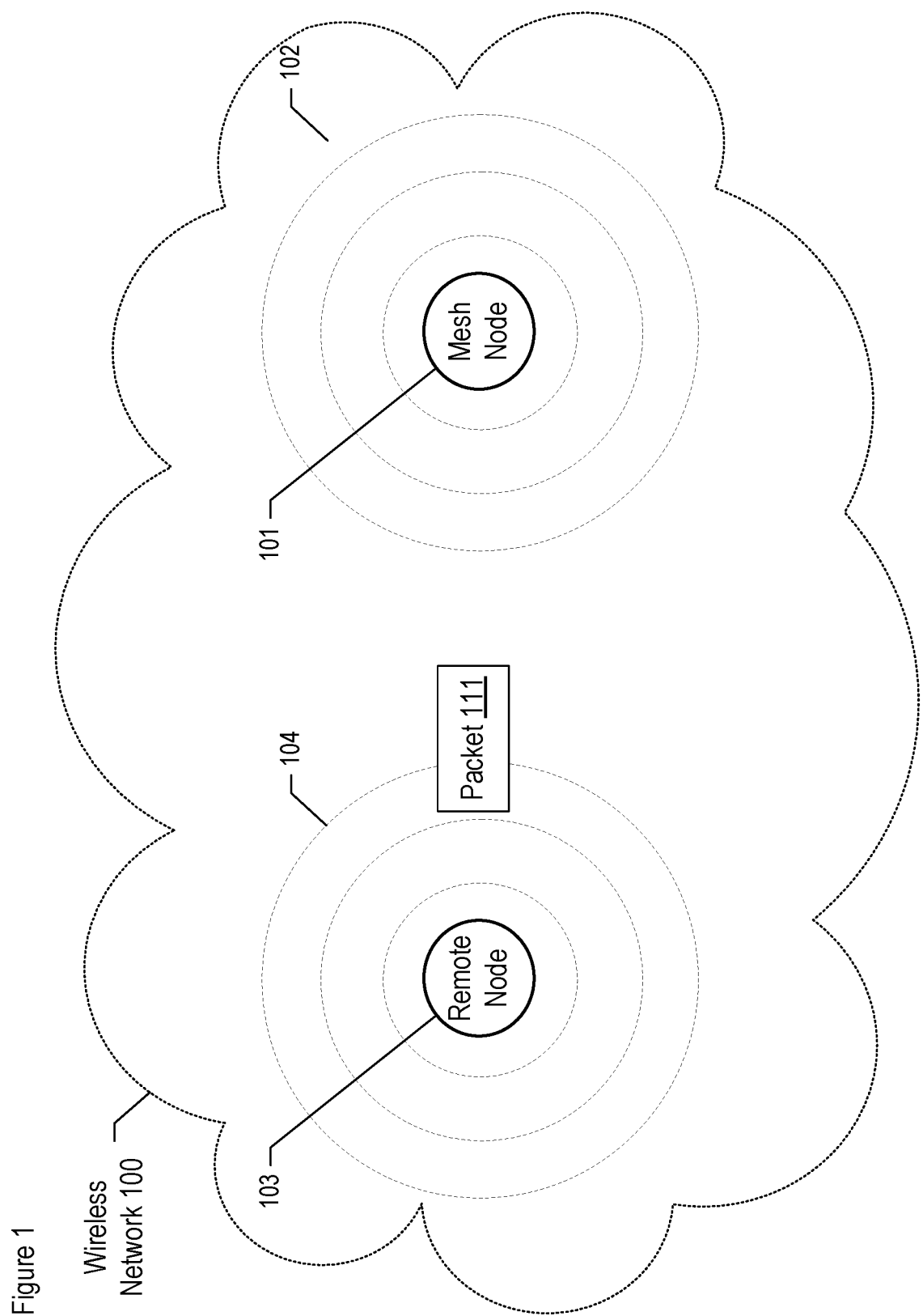
FIG. 1 depicts wireless mesh network 100 in accordance with the illustrative embodiment.

Authenticate—For the purposes of this specification, the infinitive "to authenticate" and its inflected forms (e.g., "authenticating", "authenticated", etc.) should be given the ordinary and customary meaning that the terms would have to a person of ordinary skill in the art at the time of the invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Decrypt—For the purposes of this specification, the infinitive "to decrypt" and its inflected forms (e.g., "decrypting", "decrypted", etc.) should be given the ordinary and customary meaning that the terms would have to a person of ordinary skill in the art at the time of the invention.

Determine—For the purposes of this specification, the infinitive "to determine" and its inflected forms (e.g., "determining", "determined", etc.) should be given the ordinary and customary meaning that the terms would have to a person of ordinary skill in the art at the time of the invention.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Initialization vector (IV)—For the purposes of this specification, the term "initialization vector" is defined as a value (e.g., 32-bits, etc.) that is shared by nodes in a network. Its purpose is to provide entropy (randomness) in the calculation of message nonce values. It is updated by an IV update procedure.

Memory—For the purposes of this specification, the term "memory" is defined as hardware or hardware and software capable of storing information electronically.

Node—For the purposes of this specification, the term "node" is defined as a provisioned device.

Nonce—For the purposes of this specification, the term "nonce" is defined as a number that may only be used once.

Processor—For the purposes of this specification, the term "processor" is defined as hardware or hardware and software that perform mathematical and/or logical operations, and in which operations are controlled and executed.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Subnet—For the purposes of this specification, the term "subnet" is defined as a mechanism that allows a mesh network (e.g., Bluetooth, etc.) to be partitioned. This is primarily for security purposes and is intended to allow secure isolation of different areas (e.g., individual rooms in a building, etc.) served by a network. A network may contain one or more subnets.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

FIG. 1 depicts wireless mesh network 100 in accordance with the illustrative embodiment. Mesh network 100 comprises mesh node 101 and remote node 103. For purposes of clarity, node 101 and 103 have different names in this specification, but both are considered mesh nodes in that they are provisioned devices that are capable of operating within a mesh network. The depicted nodes communicate wirelessly with one another, as well as with other mesh nodes, via signal 102 transmitted by mesh node 101 and via signal 104 transmitted by remote node 103.

Network 100 is a mesh data network that enables communication among the mesh nodes within the network, including nodes 101 and 103. To this end, the nodes within network 100 distribute data (e.g., the packet-based messages, etc.) in accordance with mesh networking, in which each node relays data for the network. The nodes that are involved cooperate in the distribution of data in the network. In doing so, the nodes in the mesh network can relay messages using either a flooding technique or a routing technique. Mesh network 100 includes multiple mesh nodes, in which each mesh node, including nodes 101 and 103, can be part of multiple subnets.

In accordance with the illustrative embodiment, mesh network 100 uses Bluetooth as the underlying radio technology to communicate among devices. As those who are skilled in the art will appreciate after reading this specification, network 100 can use a different radio technology than Bluetooth. The requirements to enable an interoperable mesh networking for Bluetooth wireless technology are defined in the Bluetooth Mesh Networking specifications, including the "Mesh Profile Specification," Revision v1.01, Jan. 21, 2019, which is incorporated by reference herein. Additional information is defined in the "Bluetooth Core Specification," Revision v5.0, which is incorporated by reference herein.

Each mesh node in FIG. 1, including nodes 101 and 103, is an apparatus that comprises memory, processing components, and communication components. In addition to communication with other nodes, each mesh node is capable of performing one or more functions. For example, remote node 103 is capable of generating and transmitting one or more private beacons, and mesh node 101 is capable of receiving the private beacons and of determining its location in relation to remove node 103 and other nodes that generate and transmit private beacons. Nodes 101 and 103 are described in detail below and in regard to FIG. 2.

Each mesh node can be a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, an access terminal, a computer, a laptop computer, a desktop computer, a tablet computer, and so on, for example and without limitation.

In accordance with the illustrative embodiment, mesh nodes 101 and 103 communicate using the Bluetooth protocol, a packet-based protocol with a master-slave structure. A Bluetooth device is configured to establish links with one or more target devices that have Bluetooth transceivers. Bluetooth devices operate in the Industrial, Scientific and Medical (ISM) 2.4 GHz short-range radio frequency band. Bluetooth devices use a radio technology referred to as "frequency-hopping spread spectrum," in which transmitted data is divided into one or more packets 111 and are transmitted on a designated Bluetooth frequency (e.g., channel).

Communications in a Bluetooth network is achieved based on a master polled system. The master polled system can utilize time-division duplexing (TDD) in which a Bluetooth device sends packet 111 to a target device. For example, remote node 103 can send packet 111 to mesh node 101 during pairing or during a connection request. In some embodiments of the present invention, the Bluetooth device can be a master device and the target Bluetooth device can be a slave device. In a master polled system, the Bluetooth device sending packet 111 gives the slave wireless device the ability to transmit back.

The Bluetooth wireless communication standard is typically employed for exchanging communications between fixed or mobile Bluetooth-enabled devices over short distances. In some configurations, the systems and methods disclosed herein may be applied to Bluetooth Low Energy (or "Bluetooth LE" or "BLE") devices. The BLE extension of the Bluetooth standard is focused on energy-constrained applications such as battery-operated devices, sensor applications, and so on. The BLE extension was referred to formerly as "Bluetooth Smart."

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZigBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

It should be noted that the Bluetooth Mesh protocol can be used on non-Bluetooth devices (e.g., a WiFi-Bluetooth gateway). These non-Bluetooth devices can implement Mesh to receive one or more packets 111 (e.g., a network protocol data unit [PDU]) remotely over the Transmission Control Protocol (TCP) and/or User Datagram Protocol (UDP) and then may send one or more packets 111 over BLE.

In a Bluetooth Mesh Profile network, a transmitting Bluetooth device, such as remote node 103, can transmit packet 111 formatted as a private beacon, and another Bluetooth device, such as mesh node 101, can receive the packet. An example of a private beacon in accordance with the Bluetooth Mesh Profile is described below and in regard to FIG. 3.

In BLE mesh terminology, a transmitting or receiving mesh node can be referred to as a "mesh bearer." A bearer is the protocol over which a mesh network packet is transmitted or received. For example, BLE Advertisements, BLE Generic Attributes (GATT) Connection, TCP/UDP, and so on can be transmitted or received by a mesh bearer.

Figure 2:
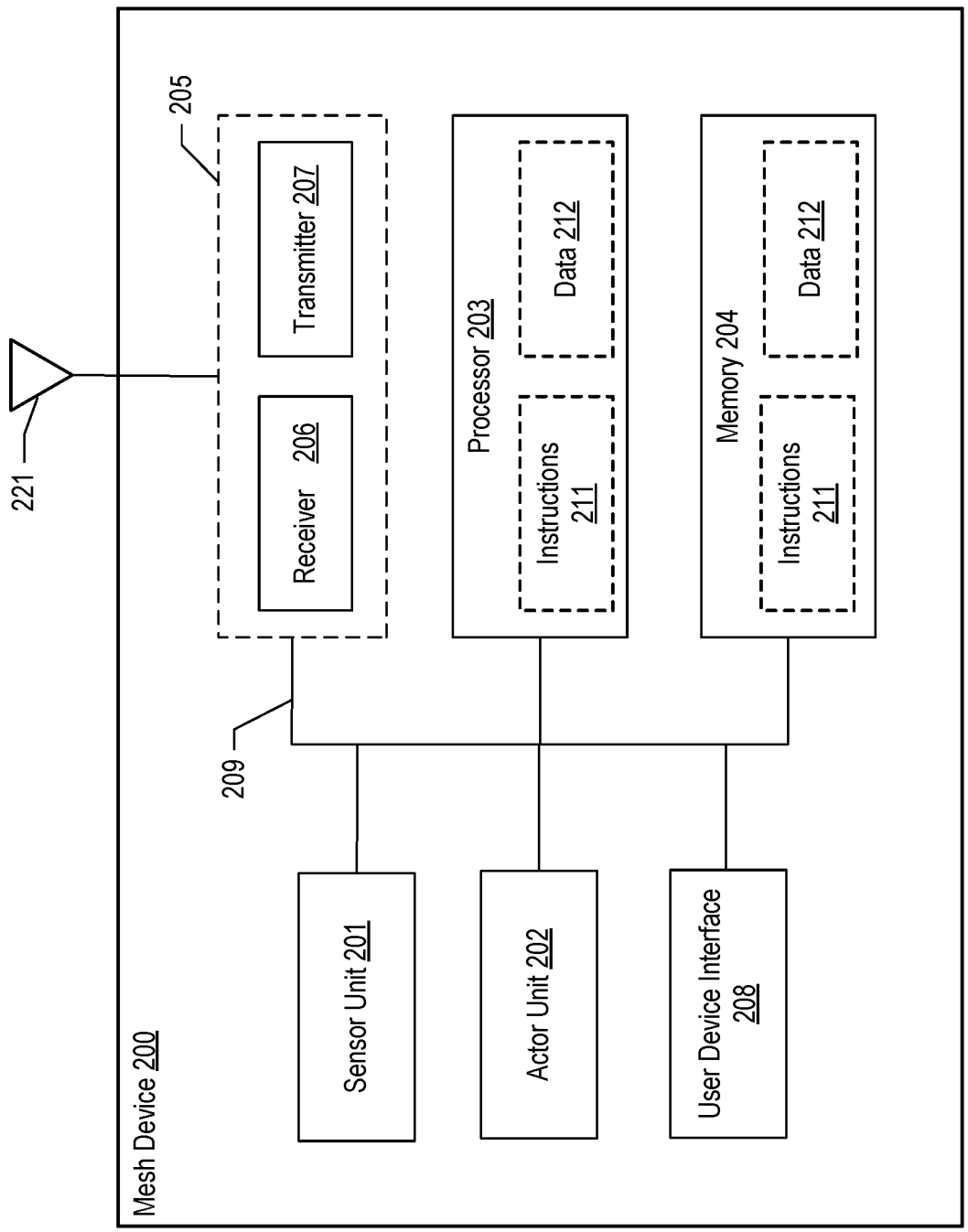
FIG. 2 depicts the salient components of mesh device 200 in accordance with the illustrative embodiment.

FIG. 2 depicts the salient components of mesh device 200 according to the illustrative embodiment. Device 200 is based on a data-processing apparatus whose hardware platform comprises at least some of: sensor unit 201, actor unit 202, processor 203, memory 204, transceiver 205, and user device interface 208, interconnected as shown. Mesh device 200 is a device (e.g., a Bluetooth device, etc.) that is capable of being provisioned and thus becoming a mesh node and a member of mesh network 100. For example, the mesh device 200 can be provisioned as mesh node 101 or remote node 103 of FIG. 1.

Various nodes within mesh network 100 can comprise different combinations of sensors, actors, processors, memory, and transceivers. For example, some nodes within mesh network 100 can comprise a controllable lamp (i.e., an actor unit), a processor, and, optionally, a sensor unit (e.g., ambient light sensor, occupancy sensor, etc.), although some such nodes might not comprise a sensor unit. Some other nodes within mesh network 100, for example, can comprise a sensor unit and a processor, but not necessarily an actor unit (e.g., lamp, etc.). As those who are skilled in the art will appreciate after reading this specification, different configurations of mesh nodes are possible, wherein each node is based on one or more of the components that are described below.

Sensor unit 201 is an apparatus that comprises memory, processing components, and communication components, and is configured to gather information about the environment that is accessible by the sensor unit. Mesh device 200 can have one or more sensor units, wherein each sensor is configured to monitor a particular physical condition in well-known fashion (e.g., temperature, ambient light, humidity, occupancy, etc.).

Each sensor unit is configured to report a state of the condition by providing input signals to processor 203, wherein the values of the input signals are representative of the states being reported. A given sensor unit 201 can report discrete input signal values and/or a continuum of states and can report states at particular times and/or continuously. A change in state, which is determined by processor 203 as described below, can occur based one or more sensor units detecting changes in the following, in any combination:
 i. environmental probes (e.g., temperature, ambient light, motion or occupancy, infrared signature, humidity, etc.).
 ii. electrical inputs (i.e., binary, analog, bus), including from a switch.
 iii. signals received via radio (e.g., proximity beacons, etc.).
 iv. a state of the internal logic, woken up periodically based on time or on an external event.

For example and without limitation, a state change can correspond to a switch being actuated, occupancy being detected, a timer or counter reaching a predefined value, and so on.

Actor unit 202 is an apparatus that comprises memory, processing components, and communication components, and is capable of doing something in the course of being affected by signals originating externally to the actor component, such as from processor 203, as described in detail below. Mesh device 200 can have one or more actor units, wherein each actor unit acts upon its environment in well-known fashion.

Actor unit 202 is configured to receive, transmit, process, and/or relay signals conveying data, as well as being configured to affect a condition, physical or otherwise, in its environment, for example by generating a control signal. Actor unit 202 provides a predetermined function, such as controlling a lamp to give light according to a configurable light output. For example and without limitation, the condition being affected can be:
 i. lighting, which can be adjusted (e.g., turning on or off, changing light output, changing brightness, changing color or mood, changing illuminance, displaying a picture or pattern, etc.).
 ii. sound, which can be adjusted (e.g., increasing or decreasing volume, changing playlist or mood, turning on/off, selecting signal source, etc.).
 iii. room climate, which can be controlled (e.g., increasing or decreasing temperature, humidity, air fragrance, fan speed, etc.).
 iv. an alert, which can be generated (e.g., of an email, of an SMS message, etc.).
 v. monitoring by a camera, which can be panned or tilted.
 vi. office meeting/presentation settings (e.g., selecting one or more of signal source, streaming application, multimedia to play, audio language, subtitles, chapter, play/pause/stop, rewind/fast forward, etc.).
 vii. connected/smart video monitor features (e.g., selecting application to be launched, navigating through on-screen menus, etc.).
 viii. virtual keyboard—navigation on virtual keyboard displayed by other device (e.g., video monitor, set-top box, etc.).
 ix. control of shades/window coverings/blinds.
 x. access control (e.g., unlocking/locking doors, opening/shutting doors, authorizing access to selected rooms or zones, etc.).

Furthermore, device 200 can comprise any combination of and any number of actor functions. As those who are skilled in the art will appreciate, after reading this disclosure, device 200 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 203 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. For example and without limitation, the processor can be part of an nRF52832 integrated circuit (IC) by Nordic Semiconductor, which is integrated with Bluetooth, or can be a SAM3X IC by Atmel Corporation.

Figure 6:
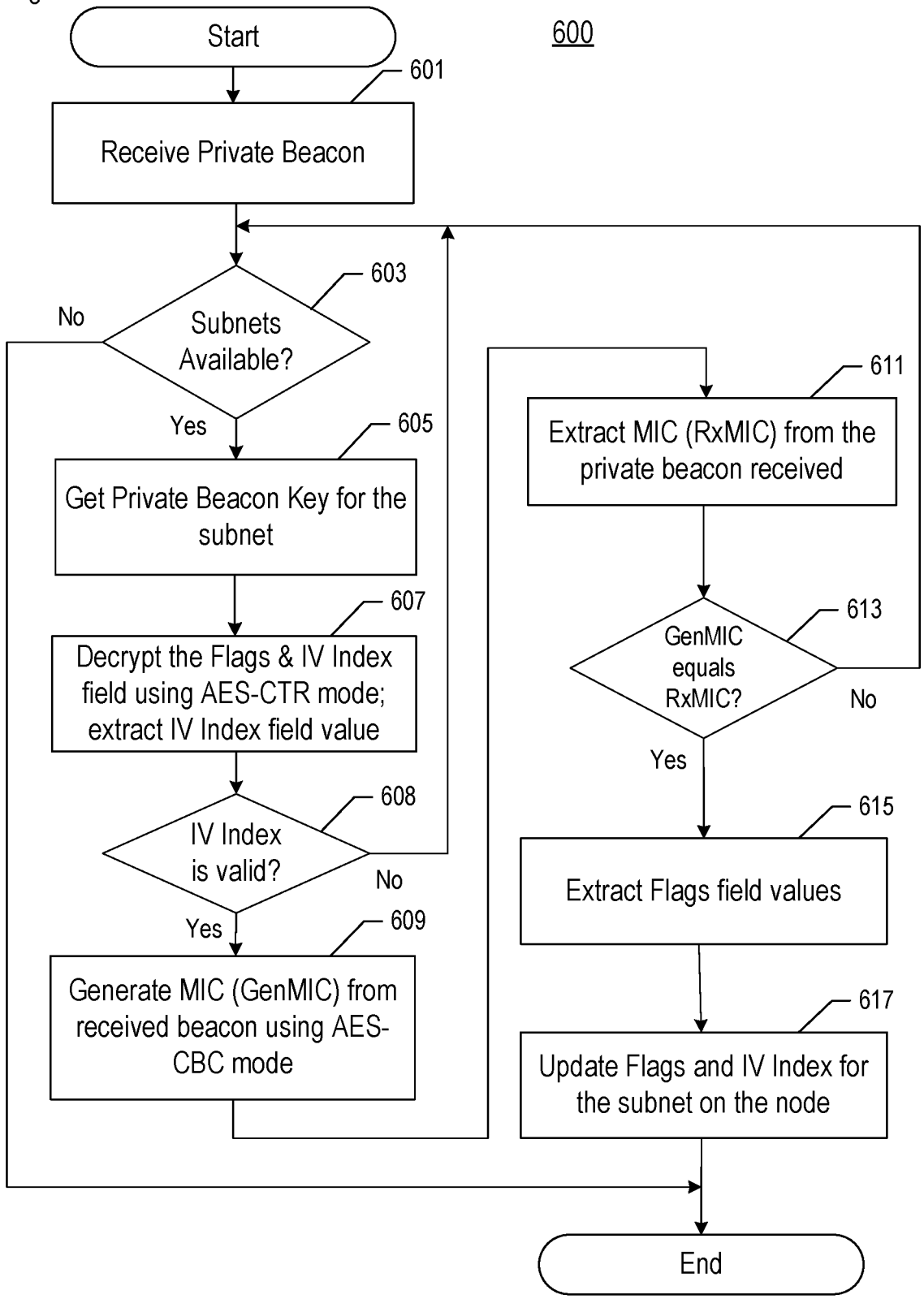
FIG. 6 depicts a flow diagram illustrating method 600 for message processing of a private beacon in accordance with the illustrative embodiment.

Processor 203 is configured such that, when operating in conjunction with the other components of device 200, processor 203 executes software in the form of instructions 211, processes data in the form of data 212, and telecommunicates according to the operations described herein, including those depicted in FIG. 6 which pertain the processing of one or more private beacons. Processor 203 can be referred to as a "central processing unit" (CPU). Although just a single processor 203 is shown as part of mesh device 200 of FIG. 2, in an alternative embodiment a combination of processors (e.g., an ARM and DSP) can be used.

Memory 204 is non-transitory and non-volatile computer storage memory technology that is well known in the art. Memory 204 is in electronic communication with processor 203 (i.e., the processor can read information from and/or write information to the memory). Memory 204 can be any electronic component capable of storing electronic information. Memory 204 can be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Memory 204 is configured to store an operating system, application software in the form of instructions 211, and a database in the form of data 212. The operating system is a collection of software that manages, in well-known fashion, device 200's hardware resources and provides common services for computer programs, such as those that constitute the application software.

The application software that is executed by processor 203 according to the illustrative embodiment enables device 200 to perform the functions disclosed herein. Instructions 211 that constitutes the application software can include one or more programs, routines, sub-routines, functions, procedures, code, and so on. The instructions may include a single computer-readable statement or many computer-readable statements. Instructions 211 may be executable by processor 203 to implement the methods disclosed herein. Executing the instructions may involve the use of the data 212 that is stored in memory 205. When processor 203 executes instructions 211, various portions of the instructions can be loaded onto processor 203, and various pieces of data 212 can be loaded onto processor 203.

It will be clear to those having ordinary skill in the art how to make and use alternative embodiments that comprise more than one memory 204; or comprise subdivided segments of memory 204; or comprise a plurality of memory technologies that collectively store the operating system, application software, and database.

Transceiver 205, which is a communication interface, is configured to enable device 200 to telecommunicate with other devices and systems, including other mesh network nodes, by receiving signals therefrom and/or transmitting signals thereto via receiver 206 and transmitter 207, respectively. Transceiver 205 communicates in accordance with Bluetooth mesh networking. In some other embodiments, transceiver 205 communicates via one or more other radio telecommunications protocols other than or in addition to Bluetooth mesh networking, as described earlier.

Receiver 206 is a component that enables device 200 to telecommunicate with other components and systems by receiving signals that convey information therefrom and through antenna 221. It will be clear to those having ordinary skill in the art how to make and use alternative embodiments that comprise more than one receiver 206.

Transmitter 207 is a component that enables device 200 to telecommunicate with other components and systems by transmitting signals that convey information thereto and through antenna 221. It will be clear to those having ordinary skill in the art how to make and use alternative embodiments that comprise more than one transmitter 207.

In accordance with the illustrative embodiment, device 200 uses transceiver 205 in order to telecommunicate wirelessly with external devices. It will clear to those skilled in the art, however, after reading the present disclosure, how to make use and use various embodiments of the present invention in which device 200 communicates via a wired protocol (e.g., X10, KNX, etc.) over physical media (e.g., cable, wire, etc.) with one or more external devices, either in addition to or instead of the wireless capability provided by transceiver 205. In some embodiments of the present invention, transceiver 205 is implemented on hardware that is physically distinct from that of processor 203, while in some other embodiments transceiver 205 is implemented on the same hardware (IC) as processor 203.

As depicted, mesh device 200 has a single transceiver 205. As those who are skilled in the art will appreciate after reading this specification, mesh device 200 can have multiple transceivers. Furthermore, each transceiver 205 can have one or more receivers 206 and/or one or more transmitters 207.

In some embodiments of the present invention, mesh device 200 also comprises user device interface 208. Interface 208 enables a user to interact with mesh device 200 and can comprise a touchscreen, a keyboard, a pointing device, a display, and so on, for example and without limitation.

The various components of mesh device 200 can be coupled together by one or more buses, which may include a power bus, a control signal bus, a status signal bus, a data bus, and so on. For purposes of clarity, the various buses are illustrated in FIG. 2 as bus system 209.

Figure 3:
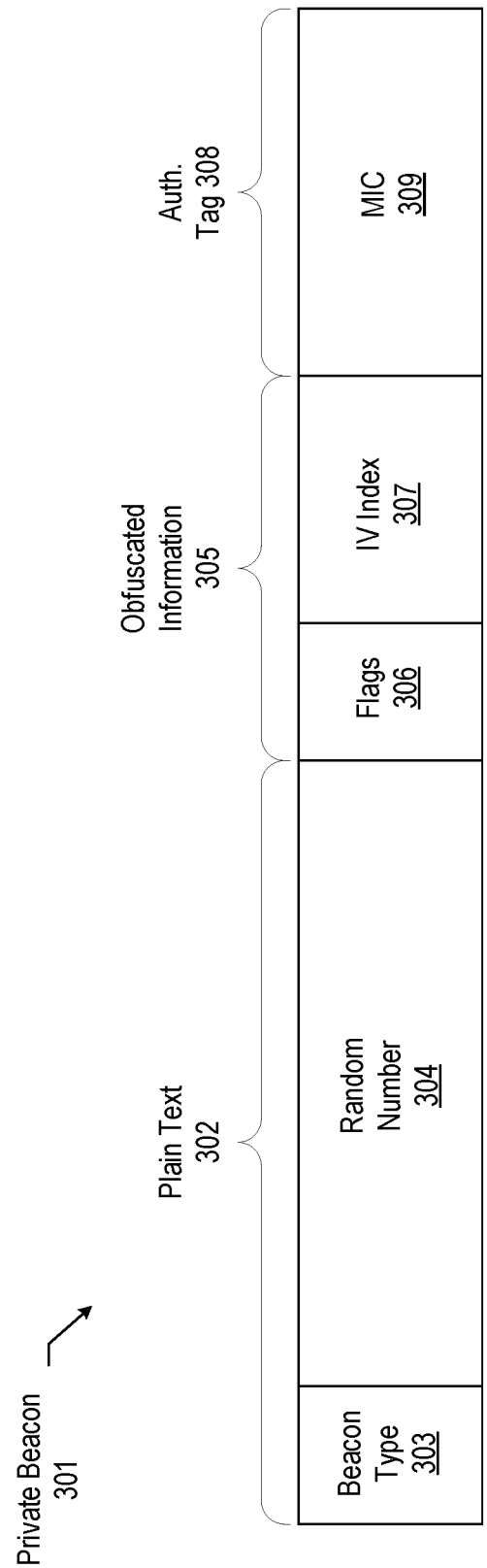
FIG. 3 illustrates an example of mesh network private beacon 301.

FIG. 3 illustrates an example of mesh network private beacon 301. The private beacon 301 message can be conveyed by one or more packets 111 described above and in regard to FIG. 1. In particular, private beacon 301 can be implemented according to the Bluetooth Mesh Profile specification.

Private beacon 301 includes a number of fields. Beacon type 303 can include a one-octet field whose value identifies private beacon 301 as a mesh private beacon. In some embodiments, the private-beacon value of beacon type 303 is "0x02". A mesh node receiving private beacon 301, such as mesh node 101, invokes private beacon processing if it detects a beacon type that corresponds to a private beacon.

Private beacon 301 can also include random number 304, which is a thirteen-octet field whose value is a random number. Random number 304 is used as an entropy source for encryption and authentication of private beacon 301.

Beacon type 303 and random number 304 make up plain text 302, in that they are transmitted as plain text.

Private beacon 301 can also include flags 306, which is a one-octet field whose values signify key refresh state and IV update state.

Private beacon 301 can also include Initialization Vector (IV) index 307, which is a four-octet field whose value identifies the IV index for network 100. IV Index is a property of the entire network and is provided to each device at the time of the provisioning of the device into the network.

Over time, a node in the network might increment the IV Index (e.g., when the sequence number of any element of the node becomes exhausted, etc.) for security reasons. The incremented IV Index is propagated to all of the nodes in the network by using the beacon message.

Flags 306 and IV Index 307 make up obfuscated information 305, in that they are transmitted as obfuscated information—in particular, as encrypted information. Obfuscated information 305 is prepared as described below and in accordance with FIG. 4.

Private beacon 301 can also include a Message Integrity Check (MIC) 309. The MIC field is an eight-octet field whose value is used by a receiving mesh node (e.g., mesh node 101, etc.) to authenticate that private beacon 301 has not been changed. MIC 309 makes up authentication tag 308.

Figure 4:
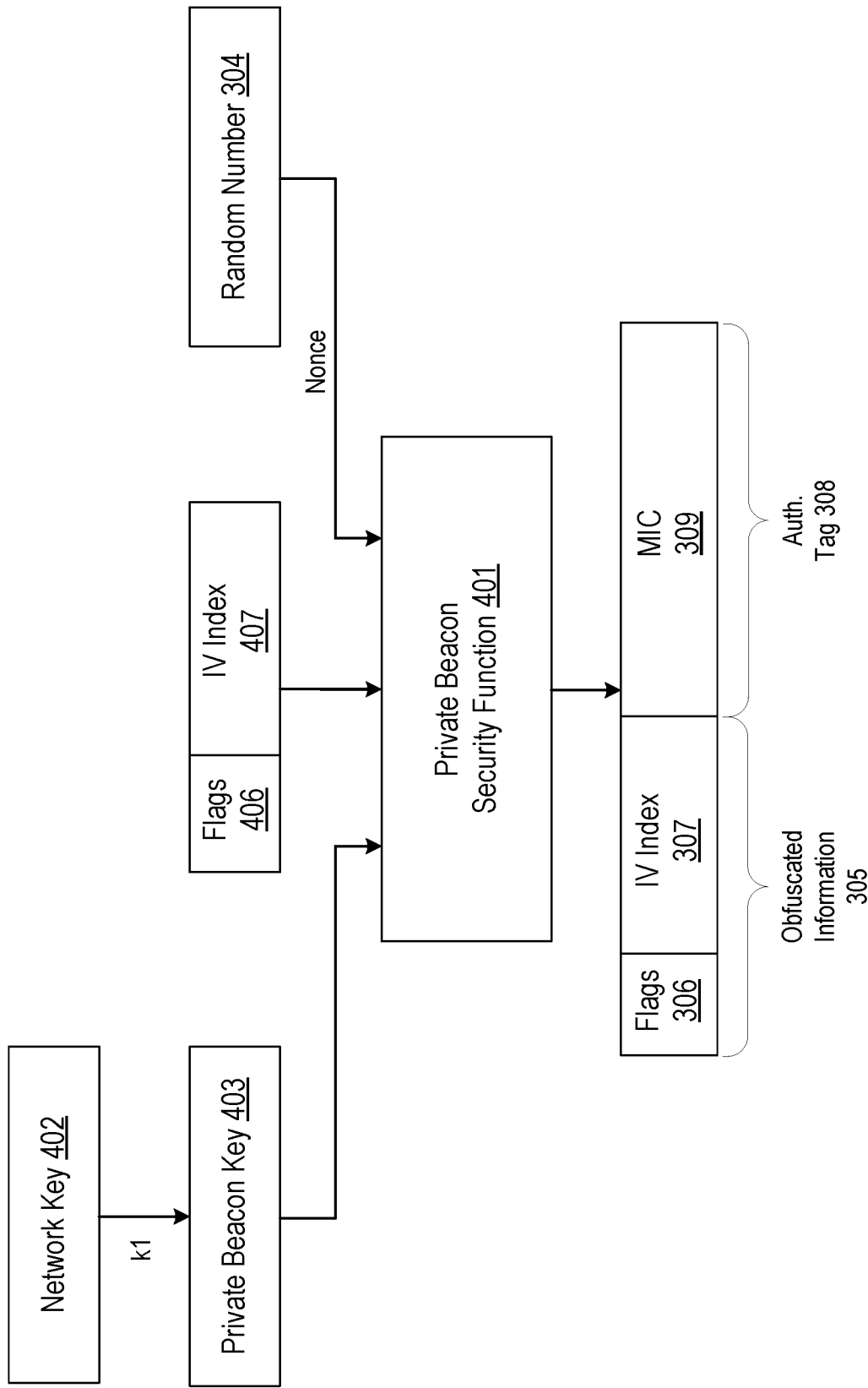
FIG. 4 depicts how private beacon 301 is secured before being transmitted.

FIG. 4 depicts how private beacon 301 is secured before being transmitted by remote node 103. Private beacon 301 is secured by private beacon security function 401 using private-beacon key 403, which is an encryption key derived from network key 402 ("k1 security function"). In some embodiments, the particular network key 402 that is to be used is identified by a network identifier (NID) or Network ID, as is known in the art.

Security function 401 encrypts or decrypts and authenticates in accordance with AES-CCM, which is part of the Advanced Encryption Standard (AES) as is known in the art. CCM stands for "Counter with Cipher Block Chaining-Message Authentication Code." In general, the data to be conveyed within private beacon 301 is encrypted and authenticated using AES-CCM, with i) a 128-bit key, referred to herein as private-beacon key 403, which is derived from network key 402, and ii) a 13-octet random number, referred to herein as random number 304, which provides the entropy for the encryption and authentication of the data.

Network keys 402 may be distributed in different ways. In a first approach, mesh nodes such as node 101 may be provisioned with one or more network keys 402. The process of authenticating and providing basic information (e.g., a unicast address and a network key 402) to mesh node 101 is referred to as "provisioning." Mesh node 101 must be provisioned with a network key 402 to become a node in mesh network 100. Once provisioned, a node can transmit or receive messages in a mesh network 100. Network key 402 may be used to secure and authenticate messages at the network layer.

A second approach for providing network key 402 to mesh node 101 is over a configuration model, once mesh node 101 is provisioned with a network key. For example, mesh node 101 may be configured with one or more additional network keys 402 using a first network key 402.

Security function 401 encrypts, at a transmitting node, unencrypted flags 406 and unencrypted IV index 407 by using private-beacon key 403, resulting in obfuscated information 305. In doing so, the AES-CTR mode (or "AES Counter" mode) portion of security function 401 also uses random number 304, which provides a nonce so as not to be used more than once for a given key. Security function 401 is also used to decrypt, at a receiving node, obfuscated information 305 by using private-beacon key 403 with AES-CTR mode, resulting in decrypted flags 406 and IV index 407.

Security function 401 generates, at a transmitting node, MIC 309 by using private-beacon key 403. In doing so, the AES-CBC mode (or "Cipher Block Chaining" mode) portion of security function 401 also uses random number 304. When received by a receiving node, MIC 309 is extracted from a received private beacon and is referred to herein as "RxMIC".

Figure 5:
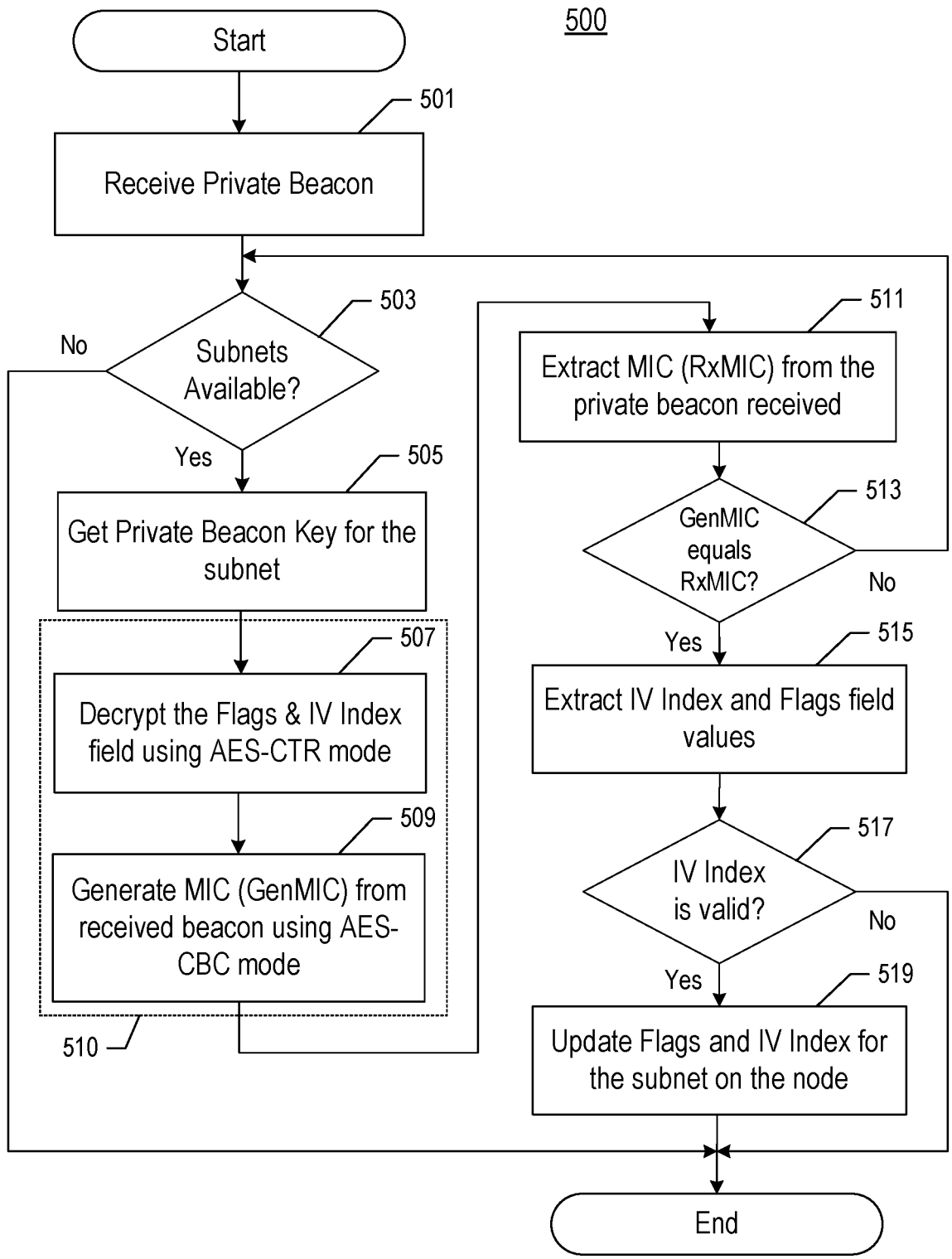
FIG. 5 depicts a flow diagram illustrating method 500 for conventional message processing of a private beacon according to Bluetooth message specifications.

FIG. 5 depicts a flow diagram illustrating method 500 for conventional message processing of a private beacon according to Bluetooth message specifications.

In accordance with operation 501, mesh node 101 receives one or more packets 111. Receiving mesh node 101 may be referred to as a "mesh bearer." Mesh node 101 determines whether packet 111 is a private beacon 301 by checking the value of beacon type field 303.

If packet 111 is a private beacon, in accordance with operation 503 mesh node 101 determines whether a subnet is available. As mesh node 101 can be part of multiple subnets, the node has to try authenticating the received private beacon with the available subnet network keys in order to identify the network and extract the payload data.

If a subnet is available, control of task execution proceeds to operation 505. Otherwise, control of task execution ends.

In accordance with operation 505, mesh node 101 retrieves private-beacon key 403 that corresponds to the current subnet. Mesh node 101 previously stored in memory 204 private-beacon key 403 that corresponds to the current subnet.

In accordance with operation 507, mesh node 101 decrypts flags 306 and IV index 307 using the AES-CTR mode, which is also known as "AES Counter" mode.

In accordance with operation 509, mesh node 101 authenticates the data, first by generating a generated message integrity check value, or "GenMIC," from received beacon 301. Security function 401 is used to generate GenMIC by using private-beacon key 403 and random number 304 in concert with AES-CBC mode, in well-known fashion. Together, operations 507 and 509 make up AES-CCM operations 510.

Continuing with the authentication process, in accordance with operation 511 mesh node 101 extracts the value for MIC 309, from the received beacon 301. The extracted value is referred to as "RxMIC."

The data is considered authenticated if, in accordance with operation 513, GenMIC and RxMIC are equal to each other, in which case control of task execution proceeds to operation 515. If the data is authenticated successfully, essentially mesh node 101 has identified the subnet to which received beacon 301 pertains. In contrast, authentication fails if GenMIC and RxMIC are not equal to each other, in which case control of task execution proceeds to operation 503 in order to determine whether any more subnets are available.

In accordance with operation 515, mesh node 101 extracts the values of the flags and IV index fields decrypted at operation 507.

In accordance with operation 517, mesh node 101 determines whether the IV index value is valid. To do so, node 101 checks whether the extracted IV Index value is within a predetermined range that is defined by the current IV state at the node; an IV Index value that is within the range is considered to be valid. If the IV index value is valid, control of task execution proceeds to operation 519; otherwise, control of task execution ends.

In accordance with operation 519, mesh node 101 updates the flags and IV index values for the subnet on the node. For example, mesh node 101 can update its current IV index value—and with, with that, its current IV state—with an incremented value received in the private beacon. An IV index update is performed to ensure that the nonce value that the node uses for the subnet is always unique.

Mesh node 101 can also perform additional processing (e.g., location-related processing, etc.) as a result of the IV index value being valid. For example and without limitation, mesh node 101 can utilize decoded private beacon 301 to determine mesh node 101's physical location, to track mesh node 101, or to trigger a location-based action on the node such as a check-in on social media or a push notification.

In some embodiments of the present invention, mesh node 101 can cache, in memory 204, all or part of the values of random number field 304 and MIC field 309 of private beacon 301, in order to avoid processing the same private beacon repeatedly. In such embodiments, node 101 checks the cache for the presence of a received private beacon.

For each available subnet being processed by mesh node 101, the conventional method of decryption and authentication, as embodied in method 500, involves four (4) AES-128-bit operations, in particular within operations 510. This means that for mesh node 101 having knowledge of N subnets, as a worst case there are 4*N AES-128 operations to decrypt and authenticate the data correctly. This also means that in the case of a private beacon being transmitted from a subnet that is unknown to mesh node 101, 4*N AES-128 operations are required by mesh node 101 before discarding the private beacon for the unknown subnet.

FIG. 6 depicts a flow diagram illustrating method 600 for message processing of a private beacon in accordance with the illustrative embodiment. It will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

In accordance with operation 601, mesh node 101 receives one or more packets 111. Mesh node 101 determines whether packet 111 is a private beacon 301 by checking the value of beacon type field 303.

If packet 111 is a private beacon, in accordance with operation 603 mesh node 101 determines whether a subnet is available. As mesh node 101 can be part of multiple subnets, the node has to try authenticating the received private beacon with the available subnet network keys in order to identify the network and extract the payload data.

If a subnet is available, control of task execution proceeds to operation 605. Otherwise, control of task execution ends.

In accordance with operation 605, mesh node 101 retrieves private-beacon key 403 that corresponds to the current subnet. Mesh node 101 previously stored in memory 204 private-beacon key 403 that corresponds to the current subnet.

In accordance with operation 607, mesh node 101 decrypts flags 306 and IV index 307 using the AES-CTR mode. Mesh node 101 also extracts the decrypted value of the IV Index field.

In accordance with operation 608, mesh node 101 determines whether the IV index value is valid. To do so, node 101 checks whether the extracted IV Index value is within a predetermined range that is defined by the current IV state; an IV Index value that is within the range is considered to be valid. For example and without limitation, the predetermined range can be inclusively between i) the current IV state and ii) the current IV state plus an offset (e.g., offset equals 42, etc.).

If the IV index value is valid, control of task execution proceeds to operation 609; otherwise, control of task proceeds to operation 603 in order to determine whether any more subnets are available.

In accordance with operation 609, mesh node 101 authenticates the data, first by generating a generated message integrity check value, or "GenMIC," from received beacon 301. Node 101 generates GenMIC by using AES-CBC mode. Security function 401 is used to generate GenMIC by using private-beacon key 403 and random number 304 in concert with AES-CBC mode, in well-known fashion.

Continuing with the authentication process, in accordance with operation 611 mesh node 101 extracts the value for MIC 309, from the received beacon 301. The extracted value is referred to as "RxMIC."

The data is considered authenticated if, in accordance with operation 613, GenMIC and RxMIC are equal to each other, in which case control of task execution proceeds to operation 615. If the data is authenticated successfully, essentially mesh node 101 has identified the subnet to which received beacon 301 pertains. In contrast, authentication fails if GenMIC and RxMIC are not equal to each other, in which case control of task execution proceeds to operation 603 in order to determine whether any more subnets are available.

In accordance with operation 615, mesh node 101 extracts the values of the flags field decrypted at operation 607. Mesh node 101 had extracted the value of the IV Index field at operation 607.

In accordance with operation 617, mesh node 101 updates the flags and IV index values for the subnet on the node. For example, mesh node 101 can update its current IV index value—and with, with that, its current IV state—with an incremented value received in the private beacon. An IV index update is performed to ensure that the nonce value that the node uses for the subnet is always unique.

Mesh node 101 can also perform additional processing (e.g., location-related processing, etc.) as a result of a successful authentication. For example and without limitation, mesh node 101 can utilize decoded private beacon 301 to determine mesh node 101's physical location, to track mesh node 101, or to trigger a location-based action on the node such as a check-in on social media or a push notification.

In some embodiments of the present invention, mesh node 101 can cache, in memory 204, all or part of the values of random number field 304 and MIC field 309 of private beacon 301, in order to avoid processing the same private beacon repeatedly. In such embodiments, node 101 checks the cache for the presence of a received private beacon.

The improved method of decryption and authentication, as embodied in method 600, in most cases reduces the number of AES operations to one (1) operation instead of four (4) operations when mesh node 101 attempts to decode a private beacon using the wrong key. The one AES operation is consumed by operation 607.

The number of AES operations is one (1) in most, but not all, cases because the probability of generating invalid data when decoded with a wrong key is high, but not 100 percent; this is because out of 32 bits in the IV Index field, only six (6) bits of incremental information is present. The six-bit length derives from i) an IV Index validity range having a width of 42, ii) IV Index incrementing by only one step most of the time, and iii) the expression $[\sim\log(42)/\log(2)]$ evaluating to six bits. As a result, the probability of undesirably generating a valid IV Index value with a wrong key is extremely unlikely—at less than 1 chance in $2^{(32-6)}$, or $2^{26}$, assuming that the AES algorithm generates ones and zeros equally likely on a random key. Even in the unlikely case that mesh node 101 does, in fact, generate a valid IV Index value with a wrong key, the subsequent authenticating of the data in operations 609 through 613 acts as a safeguard, in that the authentication based on the MIC value will fail.

Because of the reduction in the number of AES operations associated with improved method 600, mesh node 101 performs better—in terms of lower power consumption and shorter response time—than when using conventional method 500. Additionally, method 600 can be extended for general AES-CCM with comparators in hardware.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by first mesh device, one or more packets transmitted by a second mesh device;
   retrieving, by the first mesh device, a first encryption key corresponding to a first subnet;
   decrypting, by the first mesh device, a first portion of the one or more packets by using the first encryption key, wherein the first portion comprises an initialization vector (IV), and wherein the decrypting using the first encryption key results in a first decrypted value for the initialization vector;
   determining, by the first mesh device, whether the first decrypted value for the initialization vector is valid or invalid, wherein determining whether the first decrypted value for the initialization vector is valid comprises checking whether the first decrypted value for the initialization vector is within a predetermined range that is defined by the current IV state at the first mesh device; and
   authenticating, by the first mesh device, data in the one or more packets after determining that the first decrypted value for the initialization vector is valid.

2. The method of claim 1, wherein the one or more packets are Bluetooth Low Energy mesh packets.

3. The method of claim 1, wherein the one or more packets are private-beacon packets, the first encryption key is a private-beacon key, and the initialization vector is an IV index.

4. The method of claim 1, wherein the range is further defined by an offset in relation to the current IV state.

5. The method of claim 1, further comprising:
   retrieving a second encryption key corresponding to a second subnet after determining that the first decrypted value for the initialization vector is invalid;
   decrypting the first portion of the one or more packets by using the second encryption key, wherein the decrypting using the second encryption key results in a second decrypted value; and
   determining whether the second decrypted value for the initialization vector is valid or invalid.

6. The method of claim 1, wherein the authenticating of the data comprises generating a generated message integrity check (MIC) value using a Cipher Block Chaining (CBC) mode of operation.

7. The method of claim 6, wherein the authenticating of the data further comprises comparing i) the generated MIC value and ii) a MIC value in a second portion of the one or more packets.

8. A mesh device comprising:
   a receiver configured to receive one or more packets transmitted by another mesh device; and
   a processor configured to:
      (i) retrieve a first encryption key corresponding to a first subnet, (ii) decrypt a first portion of the one or more packets by using the first encryption key, wherein the first portion comprises an initialization vector (IV), and wherein decryption using the first encryption key results in a first decrypted value for the initialization vector, (iii) determine whether the first decrypted value for the initialization vector is valid or invalid, at least in part by checking whether the first decrypted value for the initialization vector is within a predetermined range that is defined by the current IV state at the mesh device, and (iv) authenticate data in the one or more packets after determining that the first decrypted value for the initialization vector is valid.

9. The mesh device of claim 8, wherein receiver is further configured to receive the one or more packets in accordance with the Bluetooth Low Energy protocol.

10. The mesh device of claim 8, wherein the receiver is further configured to receive the one or more packets as private-beacon packets, and wherein the processor is further configured to decrypt by using a private-beacon key as the first encryption key, wherein the initialization vector is an IV index.

11. The mesh device of claim 10, wherein the range is further defined by an offset in relation to the current IV state.

12. The mesh device of claim 8, wherein the processor is further configured to:

(i) retrieve a second encryption key corresponding to a second subnet after determining that the first decrypted value for the initialization vector is invalid, (ii) decrypt the first portion of the one or more packets by using the second encryption key, wherein the decrypting using the second encryption key results in a second decrypted value, and (iii) determine whether the second decrypted value for the initialization vector is valid or invalid.

13. The mesh device of claim 8, wherein the processor is further configured to generate a generated message integrity check (MIC) value using a Cipher Block Chaining (CBC) mode of operation, in order to authenticate the data.

14. The mesh device of claim 13, wherein the processor is further configured to compare i) the generated MIC value and ii) a MIC value in a second portion of the one or more packets, in order to authenticate the data.

15. A non-transitory tangible computer readable medium storing computer executable code, comprising code for causing a first mesh device to:

receive one or more packets transmitted by a second mesh device;

retrieve a first encryption key corresponding to a first subnet;

decrypt a first portion of the one or more packets by using the first encryption key, wherein the first portion comprises an initialization vector (IV), and wherein decryption using the first encryption key results in a first decrypted value for the initialization vector;

determine whether the first decrypted value for the initialization vector is valid or invalid, at least in part by checking whether the first decrypted value for the initialization vector is within a predetermined range that is defined by the current IV state at the first mesh device, and authenticate data in the one or more packets after determining that the first decrypted value for the initialization vector is valid.

16. The computer readable medium of claim 15, wherein the one or more packets are Bluetooth Low Energy mesh packets.

17. The computer readable medium of claim 15, wherein the one or more packets are private-beacon packets, the first encryption key is a private-beacon key, and the initialization vector is an IV index.

18. The computer readable medium of claim 15, further comprising code for causing the first mesh device to:

retrieve a second encryption key corresponding to a second subnet after determining that the first decrypted value for the initialization vector is invalid;

decrypt the first portion of the one or more packets by using the second encryption key, wherein the decrypting using the second encryption key results in a second decrypted value; and determine whether the second decrypted value for the initialization vector is valid or invalid.

19. The computer readable medium of claim 15, wherein the range is further defined by an offset in relation to the current IV state.

* * * * *